(12) United States Patent
Zhu et al.

(10) Patent No.: US 12,501,378 B2
(45) Date of Patent: Dec. 16, 2025

(54) SYSTEM AND METHOD FOR MULTICAST /BROADCAST SERVICE DATA SYNCHRONIZATION

(71) Applicant: ZTE CORPORATION, Guangdong (CN)

(72) Inventors: Hao Zhu, Shenzhen (CN); Tao Qi, Shenzhen (CN); Feng Xie, Shenzhen (CN); Kun Cao, Shenzhen (CN); Zijiang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 302 days.

(21) Appl. No.: 17/859,573

(22) Filed: Jul. 7, 2022

(65) Prior Publication Data

US 2022/0337367 A1    Oct. 20, 2022

Related U.S. Application Data

(63) Continuation of application No. PCT/CN2020/070986, filed on Jan. 8, 2020.

(51) Int. Cl.
*H04W 56/00* (2009.01)
*H04L 12/46* (2006.01)
*H04L 69/22* (2022.01)
*H04W 4/06* (2009.01)
*H04W 72/30* (2023.01)

(52) U.S. Cl.
CPC ....... *H04W 56/001* (2013.01); *H04L 12/4633* (2013.01); *H04L 69/22* (2013.01); *H04W 4/06* (2013.01); *H04W 72/30* (2023.01)

(58) Field of Classification Search
CPC ..... H04L 5/0048; H04L 7/0008; H04L 69/22; H04W 4/06; H04W 72/30; H04H 20/18; H04H 20/71
See application file for complete search history.

(56) References Cited

U.S. PATENT DOCUMENTS

| 8,874,167 | B2 | 10/2014 | Qiu et al. | |
| 12,069,591 | B2 * | 8/2024 | Cui | ........................ H04L 5/0048 |
| 2005/0270996 | A1 | 12/2005 | Yi et al. | |

(Continued)

FOREIGN PATENT DOCUMENTS

| CN | 101132607 A | 2/2008 |
| CN | 101350663 A | 1/2009 |

(Continued)

OTHER PUBLICATIONS

3GPP TS 25.446 version 15.0.0 Release 15, titled Universal Mobile Telecommunications System (UMTS); MBMS synchronisation protocol (SYNC) (Year: 2018).*

(Continued)

*Primary Examiner* — Ayaz R Sheikh
*Assistant Examiner* — Christopher R Davis
(74) *Attorney, Agent, or Firm* — Foley & Lardner LLP

(57) ABSTRACT

A system and method for multicast/broadcast service data synchronization. In some embodiments, the method includes transmitting, by a first network node, synchronization information to a second network node. In some embodiments, the synchronization information indicating a plurality of information elements configured to transmit Multicast/Broadcast Service (MBS) data on a user plane over an interface.

16 Claims, 24 Drawing Sheets

(56) References Cited

U.S. PATENT DOCUMENTS

| | | | |
|---|---|---|---|
| 2008/0146214 | A1 | 6/2008 | Kim et al. |
| 2011/0116433 | A1 | 5/2011 | Dorenbosch |
| 2011/0128856 | A1* | 6/2011 | Won .................. H04L 43/0852 370/237 |
| 2011/0141963 | A1 | 6/2011 | Lim |
| 2014/0105078 | A1 | 4/2014 | Zhu et al. |
| 2015/0180786 | A1 | 6/2015 | Chen et al. |
| 2016/0014571 | A1 | 1/2016 | Lee et al. |
| 2017/0134763 | A1 | 5/2017 | Hwang et al. |
| 2018/0035265 | A1 | 2/2018 | Kim et al. |
| 2018/0035328 | A1 | 2/2018 | Chen |
| 2018/0041922 | A1 | 2/2018 | Chen et al. |
| 2018/0124857 | A1 | 5/2018 | Zeng et al. |
| 2018/0183731 | A1 | 6/2018 | Shousterman et al. |
| 2018/0368109 | A1 | 12/2018 | Kim |
| 2019/0098604 | A1 | 3/2019 | Park et al. |
| 2019/0166646 | A1 | 5/2019 | Shih et al. |
| 2019/0174529 | A1 | 6/2019 | Tie et al. |
| 2019/0200414 | A1 | 6/2019 | Abraham et al. |
| 2019/0230564 | A1 | 7/2019 | Kim et al. |
| 2019/0387444 | A1 | 12/2019 | Byun et al. |
| 2020/0068581 | A1 | 2/2020 | Xu et al. |
| 2020/0205067 | A1 | 6/2020 | Liu et al. |
| 2021/0127351 | A1* | 4/2021 | Stojanovski ...... H04W 28/0268 |
| 2021/0160735 | A1 | 5/2021 | Fujishiro et al. |
| 2021/0160768 | A1* | 5/2021 | Akman ............ H04W 28/0268 |
| 2021/0297841 | A1 | 9/2021 | Jung et al. |
| 2021/0377757 | A1 | 12/2021 | Liu et al. |
| 2022/0132361 | A1 | 4/2022 | Hori et al. |
| 2022/0159760 | A1 | 5/2022 | Parron et al. |
| 2022/0264572 | A1* | 8/2022 | Li .................... H04W 56/0015 |
| 2023/0023919 | A1 | 1/2023 | Qi et al. |
| 2023/0036769 | A1 | 2/2023 | Wu et al. |
| 2023/0040690 | A1 | 2/2023 | Chen et al. |

FOREIGN PATENT DOCUMENTS

| | | |
|---|---|---|
| CN | 101562602 A | 10/2009 |
| CN | 103428637 A | 12/2013 |
| CN | 106412848 A | 2/2017 |
| CN | 108696890 A | 10/2018 |
| CN | 109565860 A | 4/2019 |
| CN | 109982266 A | 7/2019 |
| CN | 110463236 A | 11/2019 |
| CN | 110463276 A | 11/2019 |
| EP | 3 484 193 A1 | 5/2019 |
| EP | 3 723 395 A1 | 10/2020 |
| WO | WO-2008/017272 A1 | 2/2008 |
| WO | WO-2015/070370 A1 | 5/2015 |
| WO | WO-2018/175974 A1 | 9/2018 |
| WO | WO-2019/129212 A1 | 7/2019 |

OTHER PUBLICATIONS

3rd Generation Partnership Project Technical Specification 29.281 version 15.3.0 Release 15, titled Universal Mobile Telecommunications System (UMTS); LTE; General Packet Radio System (GPRS) Tunnelling Protocol User Plane (GTPv1-U) (Year: 2018).*
3rd Generation Partnership Project Technical Specification 38.415 version 15.2.0 Release 15, titled 5G; NG-RAN; PDU Session User Plane protocol (Year: 2019).*
Universal Mobile Telecommunications System (UMTS); MBMS synchronisation protocol (SYNC) (3GPP TS 25.446 version 15.0.0 Release 15) (Year: 2018).*
3GPP TS 23.246 version 15.1.0 Release 15 Universal Mobile Telecommunications System (UMTS); LTE; Multimedia Broadcast/Multicast Service (MBMS); (Year: 2019).*
AT&T: "Status update on Rel-17 5MBS work in 3GPP and potential impacts on public safety" 3GPP TSG-SA6 Meeting #34, S6-200059 Jan. 17, 2020(Jan. 17, 2020) Hyderbad, India (3 pages).
Intel Corporation: "(TP for NR BL CR for TS 38.425): Correction for the handover issues in a separated CP/UP deployment" 3GPP TSG-RAN WG3 Meeting #101, R3-185071 Aug. 24, 2018(Aug. 24, 2018) Gothenburg, Sweden (7 pages).
International Search Report and Written Opinion for PCT Appl. No. PCT/CN2020/070986 dated Oct. 10, 2020 (8 pages).
First Examination Report on IN 202227038835 dated Jul. 5, 2023 (English translation included, 6 pages).
Extended European Search Report on EP Appl. No. 20890613.1 dated Mar. 2, 2023.
3rd Generation Partnership Project; Technical Specification Group Services and System Aspects; System architecture for the 5G System (5GS); Stage 2 (Release 16), 3GPP TS 23.501 V16.3.0 (Dec. 2019), 410 pages.
First Office Action and Search Report for CN App. No. 202080092475.1 dated Mar. 27, 2024 (with English translation, 14 pages).
Zhe, X., "Research and application of TD-LTE networking and Interference", Thesis Submitted to Nanjing University of Posts and Telecommunications for the Degree of Master of Engineering, Nov. 2015 (73 pages).
Alcatel Shanghai Bell, "Discussion on E-MBMS", TSG-RAN WG3, R3-061011, Sep. 1, 2006, Tallinn, Estonia (5 pages).
First Office Action for JP Appl. No. 2022-541818, dated Jun. 16, 2023 (with English translation, 8 pages).
Huawei, "(TP for MDT BL CR for TS 38.413): E2E delay measurement", 3GPP TSG-RAN3 Meeting #106, R3-197222, Nov. 22, 2019, Reno, Nevada (18 pages).
Qualcomm Incorporated, "Flow QoS Support in Dual Connectivity", 3GPP TSG-RAN WG3 #96, R3-171796, May 19, 2017, Hangzhou, China (3 pages).
Zte, "Adding reference architecture for the 5MBS", Sa WG2 Meeting #S2-136AH, S2-2000936, Incheon, South Korea, Jan. 17, 2020 (4 pages).
D. Vargas et al., "Broadcast and multicast Communication Enablers for the Fifth-Generation of Wireless Systems Deliverable D3.3 RAN Logical Architecture and Interfaces for 5G-Xcast", XP055685520, V.2.0, Feb. 28, 2019 (95 pages).
Extended European Search Report for EP Appl. No. 20886519.6, dated Dec. 5, 2022 (9 pages).
Huawei et al.: "System Information Support over VI interface" 3GPP TSG-RAN3 Meeting #98, R3-174430, Dec. 1, 2017; Reno, Nevada (4 pages).
HUAWEI: "Delay Optimization for mobile TV mode Switching"; 3GPP TSG-RAN WG RAN2 #57 R2-070735, Feb. 16, 2007; St Louis, US (12 pages).
International Search Report and Written Opinion for PCT Appl. No. PCT/CN2020/070242 dated Sep. 28, 2020 (8 pages).
International Search Report and Written Opinion for PCT Appl. No. PCT/CN2020/080821 dated Dec. 23, 2020 (8 pages).
Nokia et al.: "Discussion on System Information for WI" 3GPP TSG-RAN WG3#103; R3-190460; Mar. 1, 2019; Athens, Greece (4 pages).
NTT Docomo, Inc.: "High level overview of functions for LTE higher layer split" 3GPP TSG-RAN WG3 RAN3#102, R3-186613; Nov. 16, 2018; Spokane, WA, USA (11 pages).
First Office Action and Search Report for CN App. No. 202080091934.4 dated Jul. 18, 2024 (received Aug. 5, 2024), (with English translation, 8 pages).
US Notice of Allowance on U.S. Appl. No. 17/854,551 DTD Aug. 28, 2024.
Office Action for KR App. No. 10-2022-7023590 dated Nov. 4, 2024 (with English translation, 7 pages).
Final Office Action on U.S. Appl. No. 17/951,740 DTD Mar. 24, 2025.
Communication pursuant to Article 94(3) EPC for EP Appl. No. 20886519.6, dated Jul. 25, 2025 (4 pages).
First Office Action for CN Appl. No. 202080100047.9, dated May 12, 2025 (with English translation, 22 pages).

* cited by examiner

| Next Extension Header Field Value | Type of Extension Header |
|---|---|
| 1000 0101 | PDU Session Container |
| 1000 0100 | NR RAN Container |
| 1000 0001 | RAN Container |
| xxxx xxxx | Other types of Extension Header (Reference 3GPP TS 29.281) |

| Bits | | | | | | | | Number of Octets | |
|---|---|---|---|---|---|---|---|---|---|
| 7 | 6 | 5 | 4 | 3 | 2 | 1 | 0 | | |
| PDU Type (=Y) | | | | spare | | | | 1 | Frame Control Part |
| Time Stamp | | | | | | | | 2 | |
| Packet Number | | | | | | | | 2 | |
| Elapsed Octet Counter | | | | | | | | 4 | |
| Total Number Of Packet | | | | | | | | 3 | |
| Total Number Of Octet | | | | | | | | 5 | |
| Header CRC | | | | Padding | | | | 1 | Frame Check Sum Part |
| Padding | | | | | | | | 0-3 | |

FIG. 9

1300

The sender obtains the value of the synchronization instruction information
1302

The GTP-U PDU of the interface is assembled on the sending end
1304

The transmitting end transmits the GTP-U PDU to the receiving end through the interface
1306

The receiving end accepts the GTP-U PDU, reads the synchronization instruction information in the GTP extension header, and checks the consistency to improve resynchronization in case of packet loss
1308

FIG. 13

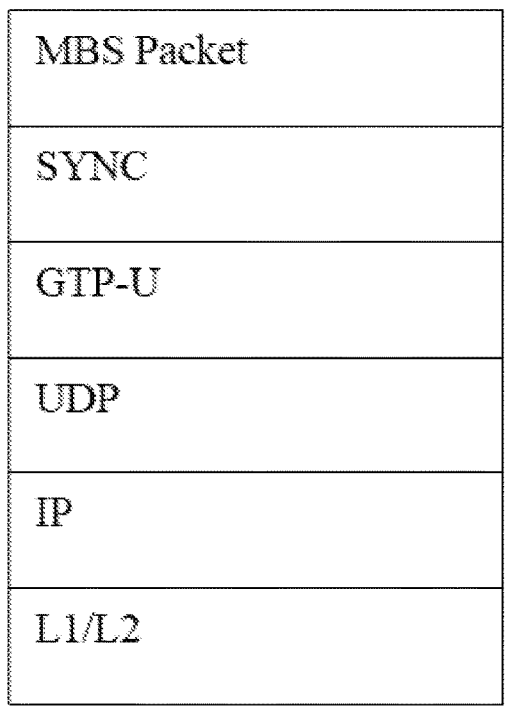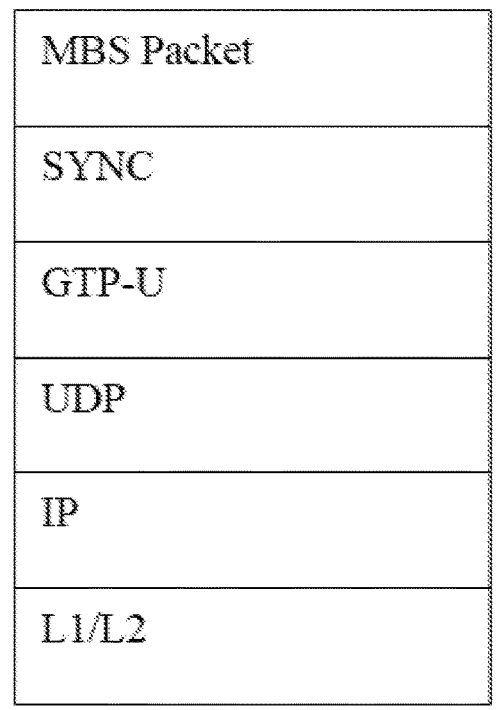
FIG. 15

| Number of Octets | 1 | 0-3 | 0-4 |
|---|---|---|---|
| Bits: 0 1 2 3 4 5 6 7 | PDU Type (=K) / spare | padding | Spare extension |

| Message Type value (Decimal) | Message |
|---|---|
| 253 | G-PDU with SYNC |
| 255 | G-PDU |

| Bits | | | | | | | | Number of Octets | |
|---|---|---|---|---|---|---|---|---|---|
| 7 | 6 | 5 | 4 | 3 | 2 | 1 | 0 | | |
| PDU Type (=X) | | | | spare | | | | 1 | Frame Control Part |
| Time Stamp | | | | | | | | 2 | |
| Packet Number | | | | | | | | 2 | |
| Elapsed Octet Counter | | | | | | | | 4 | |
| Header CRC | | | | Payload CRC | | | | 2 | Frame Check Sum Part |
| Payload CRC | | | | | | | | | |
| Payload Fields | | | | | | | | 1~n | Frame Payload part |
| Payload Fields | | | | Padding | | | | | |
| Spare extension | | | | | | | | 0-4 | |

| Bits | | | | | | | | Number of Octets | |
|---|---|---|---|---|---|---|---|---|---|
| 7 | 6 | 5 | 4 | 3 | 2 | 1 | 0 | | |
| PDU Type (=3) | | | | spare | | | | 1 | Frame Control Part |
| Time Stamp | | | | | | | | 2 | |
| Packet Number | | | | | | | | 2 | |
| Elapsed Octet Counter | | | | | | | | 4 | |
| Total Number Of Packet | | | | | | | | 3 | |
| Total Number Of Octet | | | | | | | | 5 | |
| Header CRC | | | | Payload CRC | | | | 2 | Frame Check Sum Part |
| Payload CRC | | | | | | | | | |
| Length of the 1st Packet | | | | | | | | 1.5* (Packet Number -1) + 2 | Frame Payload part |
| Length of the 1st Packet (cont) | | | | Length of 2nd packet | | | | | |
| ... | | | | | | | | | |
| Length of the Nth Packet | | | | | | | | | |
| Length of the Nth Packet (cont) | | | | Padding | | | | | |
| Spare extension | | | | | | | | 0-4 | |

| Bits | | | | | | | | Number of Octets | |
|---|---|---|---|---|---|---|---|---|---|
| 7 | 6 | 5 | 4 | 3 | 2 | 1 | 0 | | |
| PDU Type (=3) | | | | spare | | | | 1 | Frame Control Part |
| Time Stamp | | | | | | | | 2 | |
| Packet Number | | | | | | | | 2 | |
| Elapsed Octet Counter | | | | | | | | 4 | |
| Total Number Of Packet | | | | | | | | 3 | |
| Total Number Of Octet | | | | | | | | 5 | |
| Header CRC | | | | Payload CRC | | | | 2 | Frame Check Sum Part |
| Payload CRC | | | | | | | | | |
| Length of the 1st Packet | | | | | | | | 1.5* Packet Number | Frame Payload part |
| Length of the 1st Packet (cont) | | | | Length of the 2nd Packet | | | | | |
| ... | | | | | | | | | |
| Length of the Nth Packet | | | | | | | | | |
| Spare extension | | | | | | | | 0-4 | |

FIG. 21B

SYSTEM AND METHOD FOR MULTICAST /BROADCAST SERVICE DATA SYNCHRONIZATION

CROSS-REFERENCE TO RELATED APPLICATION

This application claims the benefit of priority under 35 U.S.C. § 120 as a continuation of PCT Patent Application No. PCT/CN2020/070986, filed on Jan. 8, 2020, the disclosure of which is incorporated herein by reference in its entirety.

TECHNICAL FIELD

The disclosure relates generally to wireless communications and, more particularly, to systems and methods for multicast/broadcast service data synchronization.

BACKGROUND

Mobile network multicast/broadcast service (MBS) is a technology for mobile network data source nodes to transmit data to multiple target nodes, which can realize the sharing and effective use of network resources, especially air interface resources. In the Long Term Evolution (LTE) system, in order to realize the synchronous transmission of multicast/broadcast service data in the air interface within a group of cells, the SYNC protocol is introduced between the Broadcast/Multicast Service Center (BMSC) and the eNB.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

One aspect disclosed herein is directed to a method for multicast/broadcast service data synchronization. In some embodiments, the method includes transmitting, by a first network node, synchronization information to a second network node. In some embodiments, the synchronization information indicating a plurality of information elements configured to transmit Multicast/Broadcast Service (MBS) data on a user plane over an interface.

Another aspect disclosed herein is directed to a method for multicast/broadcast service data synchronization. In some embodiments, the method includes receiving, by a second network node from a first network node, synchronization information. In some embodiments, the method includes the synchronization information indicating a plurality of information elements configured to transmit Multicast/Broadcast Service (MBS) data on a user plane over an interface.

In some embodiments, synchronization information may be transmitted/received between a <first network node, second network node> pair, which may be, for example, <UPF, gNB>, <gNB-CU, gNB-DU>, or two gNBs.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5 illustrates a table of example definitions of an Extension Header Type, in accordance with an embodiment of the present disclosure.

FIG. 9 illustrates a diagram of an example SYNC INFORMATION WITHOUT PAYLOAD (PDU Type Y) format, in accordance with an embodiment of the present disclosure.

FIG. 13 is a flow diagram depicting a method for transmitting MBS synchronization information, in accordance with some embodiments of the present disclosure.

FIG. 15 illustrates a block diagram of an example N3/Xn-U/F1-U protocol stack interface, in accordance with some embodiments of the present disclosure.

FIG. 18 illustrates a diagram of an example Message Type value definition, in accordance with an embodiment of the present disclosure.

FIG. 19 illustrates a diagram of an example SYNC PDU Type X Format, in accordance with an embodiment of the present disclosure.

FIG. 21A illustrates a diagram of an example SYNC PDU Type Z Format (Odd number of packets, i.e. N=1, 3, 5, etc.), in accordance with an embodiment of the present disclosure.

FIG. 21B illustrates a diagram of an example SYNC PDU Type Z Format (Even number of packets, i.e. N=2, 4, 6, etc.), in accordance with an embodiment of the present disclosure.

DETAILED DESCRIPTION OF EXEMPLARY EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
5G NR 5th Generation Mobile Networks New Radio
BMSC Broadcast/Multicast Service Centre
gNB-CU gNB-Centralized Unit
gNB-DU gNB-Distributed Unit
gNB gNodeB
GPRS General Packet Radio Service
GTP-U GPRS Tunneling Protocol—User Plane Header
IP Internet Protocol
LTE Long Term Evolution
MAC-CE Medium Access Control-Control Element
MBMS-GW Multimedia Broadcast Multicast Service Gateway
MBS Mobile Network Multicast/Broadcast Service
PDU Protocol Data Unit
RLC Radio Link Control
SDU Service Data Unit
T-PDU Protocol Data Unit
TNL Transport Network Layer
UDP User Datagram Protocol
UE User Equipment Mobile network multicast/broadcast service (MBS) is a technology for mobile network data source nodes to transmit data to multiple target nodes, which can realize the sharing and effective use of network resources, especially air interface resources. In the Long Term Evolution (LTE) system, in order to realize the synchronous transmission of multicast/broadcast service data in the air interface within a group of cells, the SYNC protocol is introduced between the BMSC and the eNB.

Figure 1:
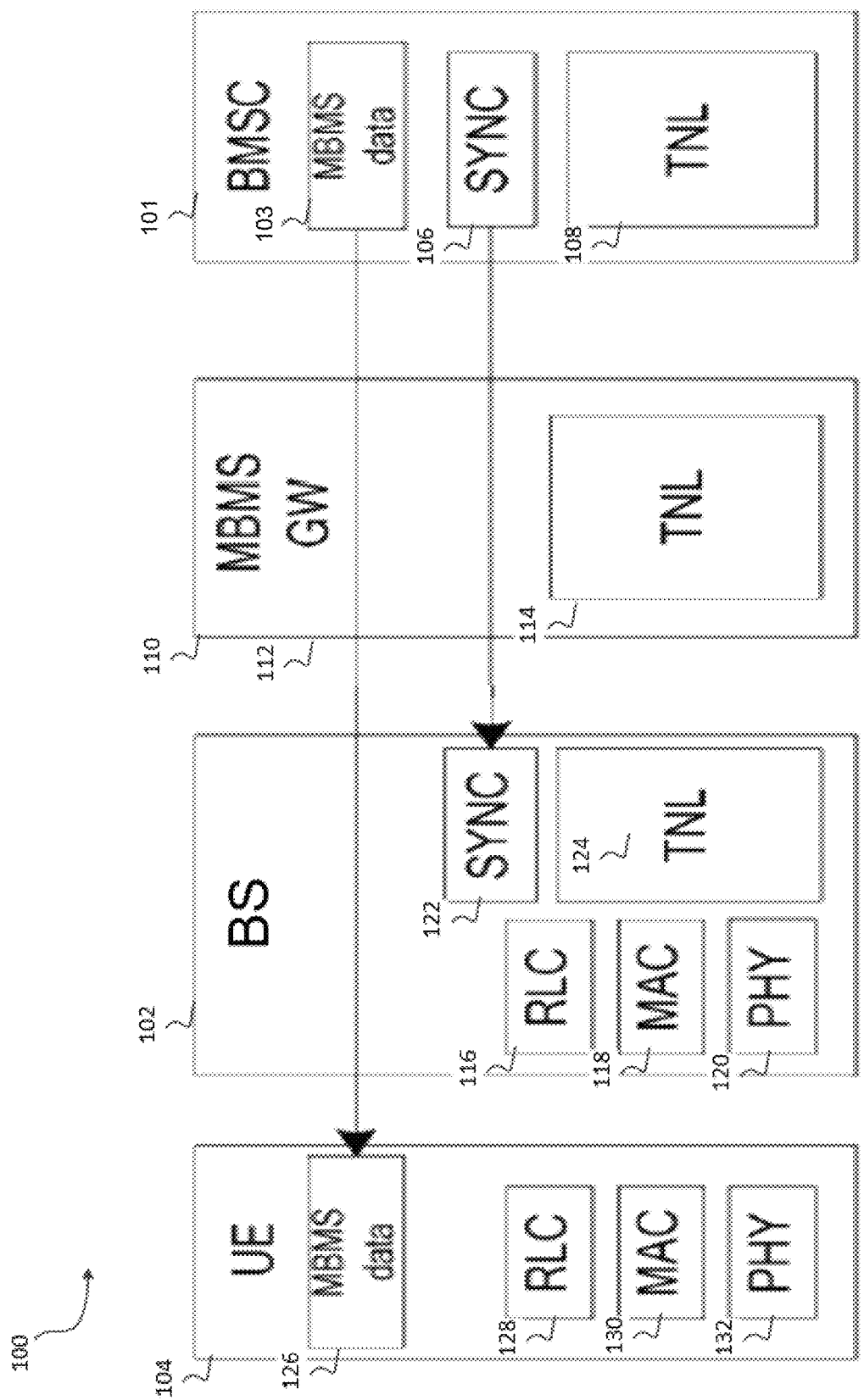
FIG. 1 illustrates a block diagram of an example environment for multicast/broadcast service data synchronization, in accordance with the solution in LTE systems.

For example, FIG. 1 illustrates a block diagram of an example environment for multicast/broadcast service data synchronization, in accordance with the solution in LTE systems. The environment 100 includes various components, such as a Broadcast/Multicast Service Centre (shown in FIG. 1 as, "BMSC 101"), a Multimedia Broadcast Multicast Service Gateway (shown in FIG. 1 as, "MBMS-GW 110"), a BS 102, and a UE 104. The BMSC 102 includes a MBMS data 103, synchronization indication information 106 (shown in FIG. 1 as, "SYNC"), and transport network layer 108 (shown in FIG. 1 as, "TNL"). The MBMS-GW 110 includes a TNL 114. The BS 102 includes a Radio Link Control layer 116 (shown in FIG. 1 as, "RLC"), a media access layer 118 (shown in FIG. 1 as, "MAC"), and a physical layer 120 (shown in FIG. 1 as, "PHY") the UE 104 includes MBMS data 126, RLC 128, MAC 130, and PHY 132. In some embodiments, the BMSC 101 may send the MBMS data 103 to UE 104, such that MBMS data 126 may be MBMS data 103. In some embodiments, the BMSC 101 may send the SYNC 106 to BS 102, such that SYNC 122 may be SYNC 106. The BMSC 101 carries synchronization indication information such as time stamp and packet size in the message. The BS 102 determines the sending time of the data on the air interface according to the synchronization indication information, so as to realize the synchronous transmission of data on the air interface in the cell group.

There are two differences between a 5G NR system and an LTE system. On the one hand, in an LTE system, the core network elements and interfaces used to transmit multicast/broadcast data to the eNB are different from the core network elements and interfaces used for unicast. But in a 5G NR system, the network elements and interfaces used to transmit multicast/broadcast data to the gNB are the same. On the other hand, in a 5G NR system, the node gNB responsible for the air interface transmission function consists of two separate modules, namely gNB-CU and gNB-DU.

Thus, in order to realize the synchronous transmission of MBS service data across gNB or across cells in a gNB-DU cell group in a 5G NR system, a multicast/broadcast service data synchronization scheme should be capable of sharing the interface with unicast services, for example, by transmitting the MBS service data synchronization instruction information to gNB-DU.

However, conventional systems are incapable of sharing such interfaces with a unicast service, thereby preventing such systems from realizing the synchronous transmission of the MBS service data across gNB or across cells in a gNB-DU cell group in a 5G NR system.

Accordingly, the present disclosure is directed to realizing the transmission of MBS service data synchronization indication information based on the location of the synchronization information in a 5G NR interface, such as an N3 interface, an Xn-U interface, and/or an F1-U interface (collectively referred to herein, as "N3/Xn-U/F1-U interfaces").

In general, the present invention describes various embodiments for providing multi-cell synchronization of NR MBS service data. By way of a non-limiting example, the embodiments described herein may include one or more of the following features:

A "first feature" relates to synchronization instruction information for transmitting MBS service data stream on an N3/Xn-U/F1-U interface user plane.

A "second feature" relates to defining, based on the "first feature", a GTP-U extension header for transmitting MBS service data synchronization indication information.

A "third feature" relates to defining, based on the "second feature", each interface N3/Xn/F1-U user plane protocol PDU format for transmitting MBS service data synchronization indication.

A "fourth feature" relates to defining, based on the "third feature", the type of GTP-U Container used to transmit MBS service data synchronization instruction information.

A "fifth feature" relates to defining, based on the "first feature", a protocol layer for transmitting MBS service data synchronization indication information above the transport network layer.

A "sixth feature" relates to defining, based on the "fifth feature", whether the data above the transport network layer is the user plane protocol PDU type of each interface of the SYNC PDU.

A "seventh feature" relates to defining, based on the "fifth feature", the GTP-U extension header type used to identify whether data above the transmission network layer is a SYNC PDU.

An "eighth feature" relates to defining, based on the "fifth feature", the message type used to identify whether the data above the transmission network layer is a SYNC PDU in the GTP-U Header.

A "ninth feature" relates to defining, based on the "first feature", the sender writes synchronization instruction information in the downlink data packet of an N3/Xn-U/F1-U interface;

A "tenth feature" relates to obtaining, based on the "ninth feature", the value of the synchronization indication information. In some embodiments, the sender obtains relevant information from the memory and autonomously determines the value of the synchronization instruction information identifier. In some embodiments, the sender reads the value of the synchronization instruction information from the MBS service data stream carrying the synchronization instruction information and makes modifications or does not make modifications.

An "eleventh feature" relates to receiving end reads the synchronization indication information from the downlink data packet of the interface.

1. Multicast/Broadcast Service Data Synchronization

Figure 2:
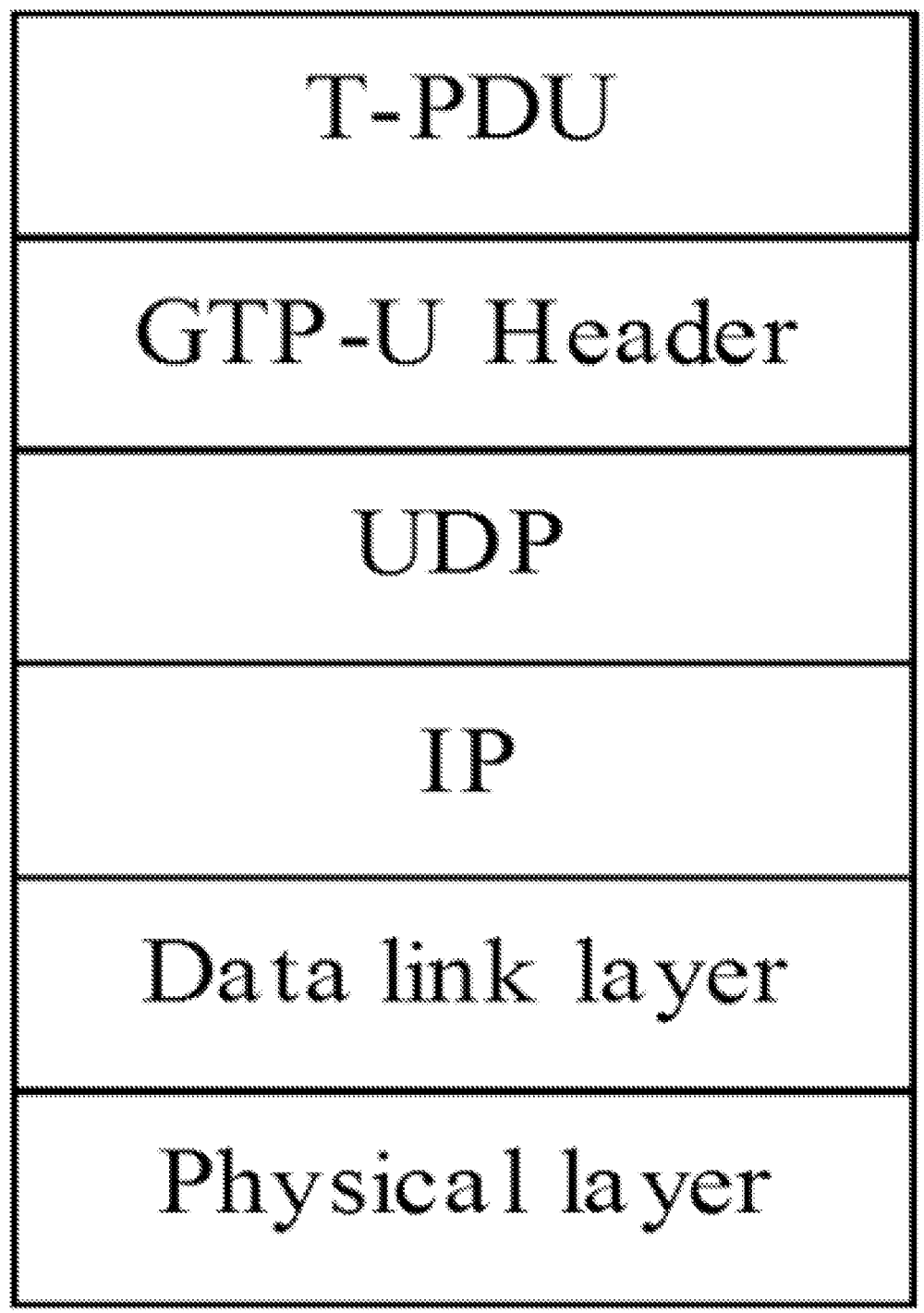
FIG. 2 illustrates a block diagram of an example N3/Xn-U/F1-U interface protocol stack, in accordance with an embodiment of the present disclosure.

FIG. 2 illustrates a block diagram of an example N3/Xn-U/F1-U interface protocol stack, in accordance with an embodiment of the present disclosure. The N3/Xn-U/F1-U interface protocol stack 200 includes a Tunneling Protocol User Plane (shown in FIG. 4 as, "T-PDU", a GPRS Tunneling Protocol—User Plane header (shown in FIG. 2 as, "GTP-U Header"), a User Datagram Protocol (shown in FIG. 2 as, "UDP"), an Internet Protocol (shown in FIG. 4 as, "IP"), a data link layer, and a physical layer. In the 5G user plane, the interface between the core network element UPF and gNB is the N3 interface, the interface between gNB and gNB is the Xn-U interface, and the interface between gNB-CU and gNB-DU is the F1-U interface. Among the N3/Xn-U/F1-U interfaces, the transport network layer protocol is based on the GTP-U protocol, and the GTP-U packet is composed of a GTP-U header and a T-PDU. The T-PDU is used to encapsulate the actual end-to-end protocol data PDU.

Figure 3:
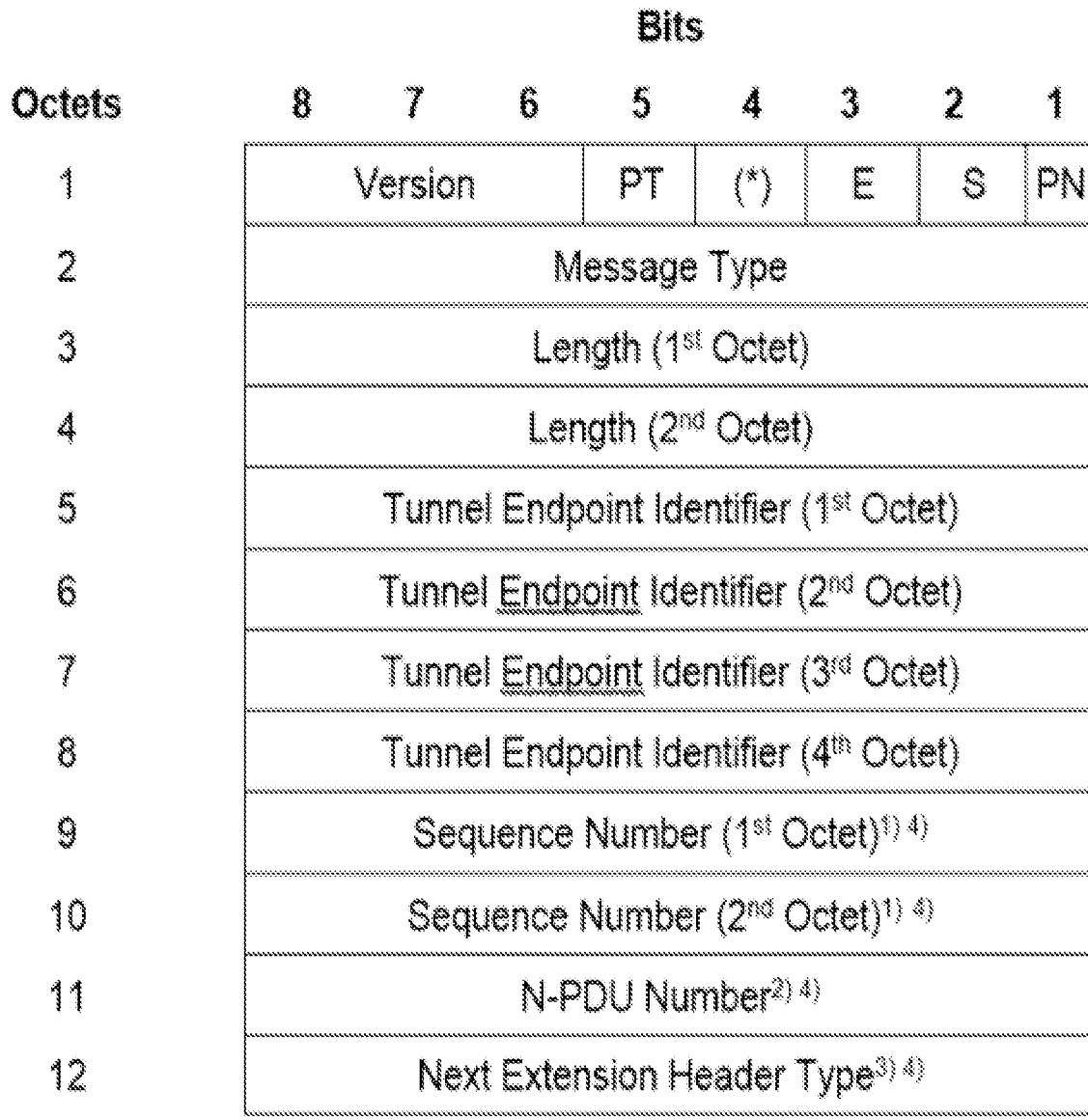
FIG. 3 illustrates a block diagram of a GTP-U Header, in accordance with an embodiment of the present disclosure.
Figure 4:
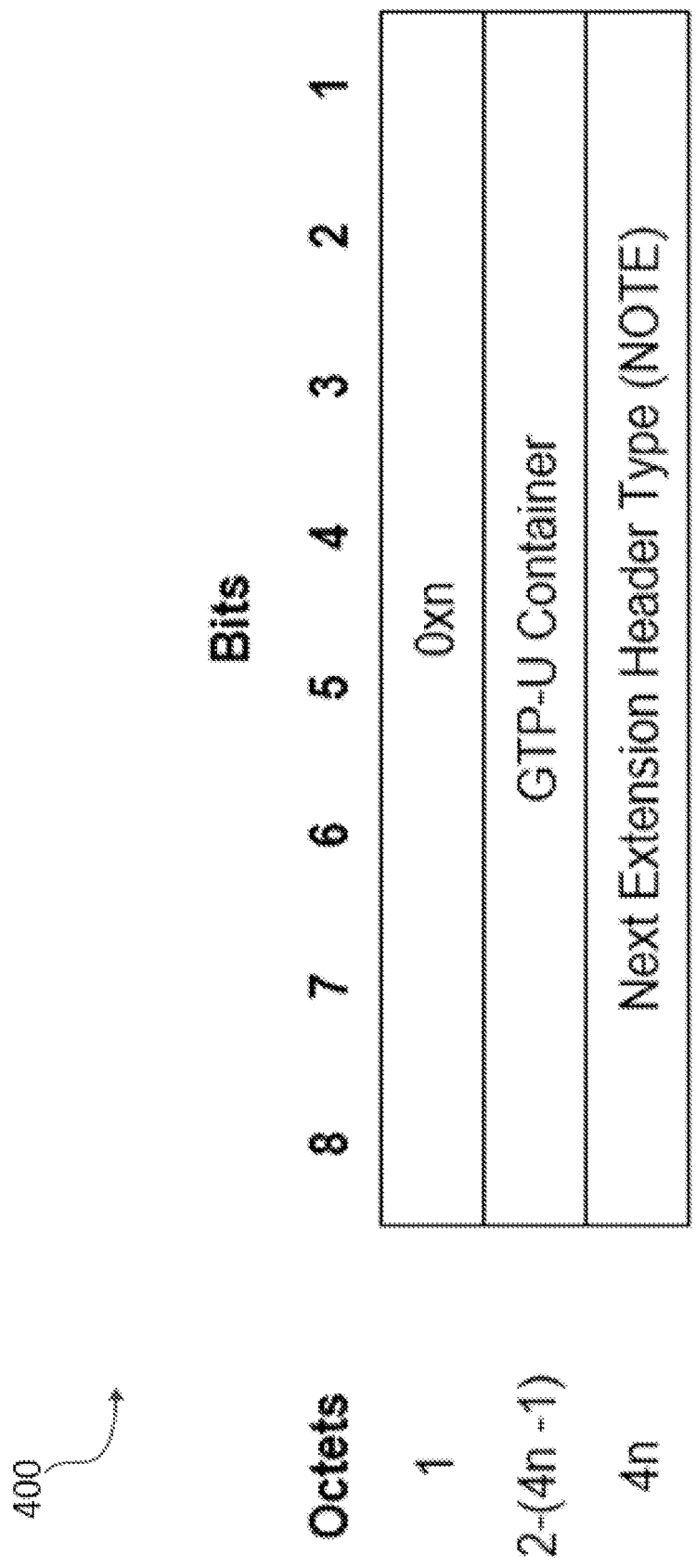
FIG. 4 illustrates a block diagram of a GTP-U Extension Header, in accordance with an embodiment of the present disclosure.

The GTP-U header includes a basic header structure and an extended header structure, as shown in FIG. 3 and FIG. 4, respectively. For example, FIG. 3 illustrates a block diagram of a GTP-U Header, in accordance with an embodiment of the present disclosure. As another example, FIG. 4 illustrates a block diagram of a GTP-U Extension Header, in accordance with an embodiment of the present disclosure. The extension header 400 carries a GTP-U Container, which is used to define the format of the user plane protocol PDU for each of the N3/Xn-U/F1-U interfaces.

FIG. 5 illustrates a table of example definitions of an Extension Header Type, in accordance with an embodiment of the present disclosure. In the N3 interface, the type of the GTP-U Container is PDU Session Container, and the IE carried by it defines the format of the PDU Session user plane protocol (PDU); in the Xn-U interface, the GTP-U Container The type is NR RAN Container. The IE carried by it defines the format of the NR user plane protocol PDU. In the F1-U interface, the IE carried by the GTP-U Container defines the F1 user plane protocol PDU Format. The basic header and extension header indicate the type of the next extension header through the "Next Extension Header Type" (IE). The value of the "Next Extension Header Type" IE is shown in FIG. 5.

2. Carrying Synchronization Information in the GTP-U Extension Header

For transmitting MBS service data synchronization instruction information, the GTP-U extension header may carry the synchronization indication information of MBS service data. In some embodiments, a first network node (e.g., gNB-CU) may transmit synchronization information to a second network node. The synchronization information indicating a plurality of information elements configured to transmit Multicast/Broadcast Service (MB S) data on a user plane over an interface. In some embodiments, a second network node (e.g., gNB-DU) may receive, the first network node, synchronization information from the first network node.

In some embodiments, the interface may be selected from the group consisting of: an N3 interface, an Xn-U interface, and an F1-U interface. In some embodiments, the first network node and/or the second network node may use a defined General Packet Radio Service Tunneling Protocol-User (GTP-U) extension header to transmit the synchronization information. In some embodiments, the first network node and/or the second network node may use a defined General Packet Radio Service Tunneling Protocol-User (GTP-U) extension header to receive the synchronization information.

In some embodiments, the type of GTP-U extension header carrying synchronization indication information of MBS service data is the corresponding "GTP-U Container" type in the existing interface protocol, but a new format of each user plane protocol PDU is defined to carry the synchronization indication information. In some embodiments, to configure a GTP-U extension header, the first network node and/or the second network node may select, based on the interface, the GTP-U extension header from a plurality of predefined extension headers. Each of the plurality of predefined extension headers may correspond to one of a plurality of interfaces. To configure a GTP-U extension header, the first network node and/or the second network node may use a defined Protocol Data Unit (PDU) format for the interface.

In some embodiments, the PDU format includes a padding information element to ensure that a length of the PDU format to be 4×n−2, n being a positive integer.

Figure 6:
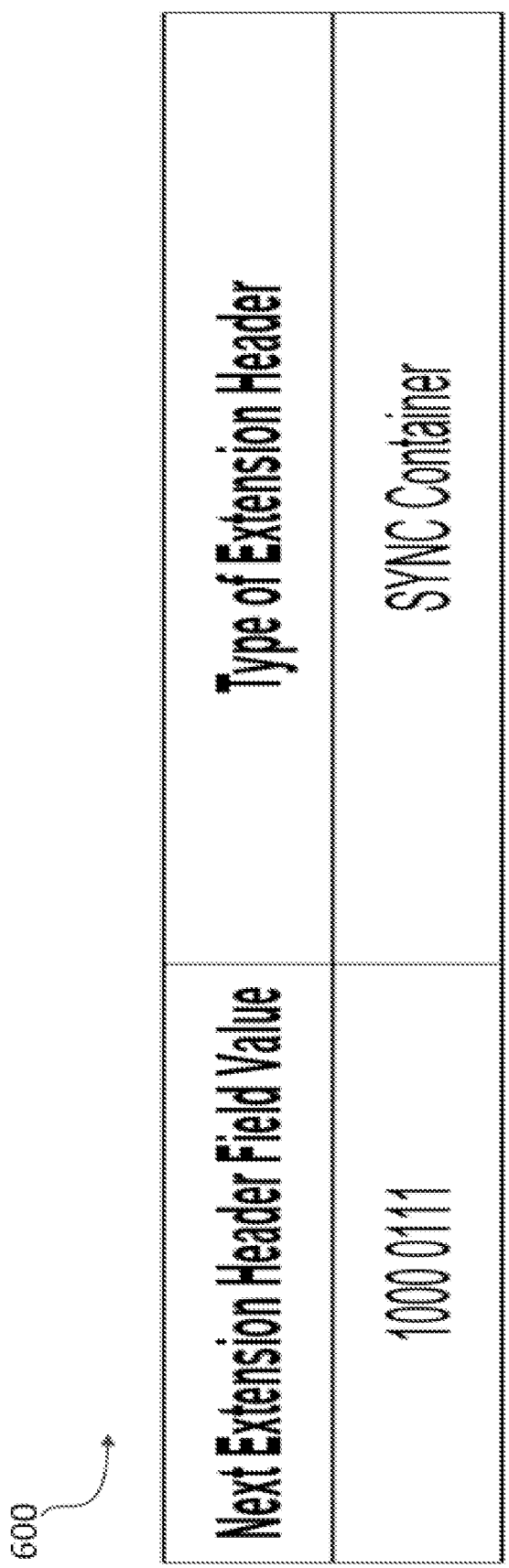
FIG. 6 illustrates a table of an example definition of an Extension Header Type, in accordance with an embodiment of the present disclosure.

In some embodiments, a GTP-U extension header type identifier (herein referred as, "a SYNC Container type extension header") may be used to carry synchronization indication information of MBS service data. The value of this extension header type identifier may be different from the value of the existing extension header type identifier. For example, FIG. 6 illustrates a table of an example definition of an Extension Header Type, in accordance with an embodiment of the present disclosure. The table 600 shows that the SYNC Container type extension header with a Next Extension Header Field Value of '1000 0111'. To configure the GTP-U extension header of GTP-U PDU, the first network node and/or the second network node may combine the SYNC Container type extension header with a plurality of predefined extension headers. Each of the plurality of predefined extension headers corresponding to one of a plurality of interfaces.

Figure 7:
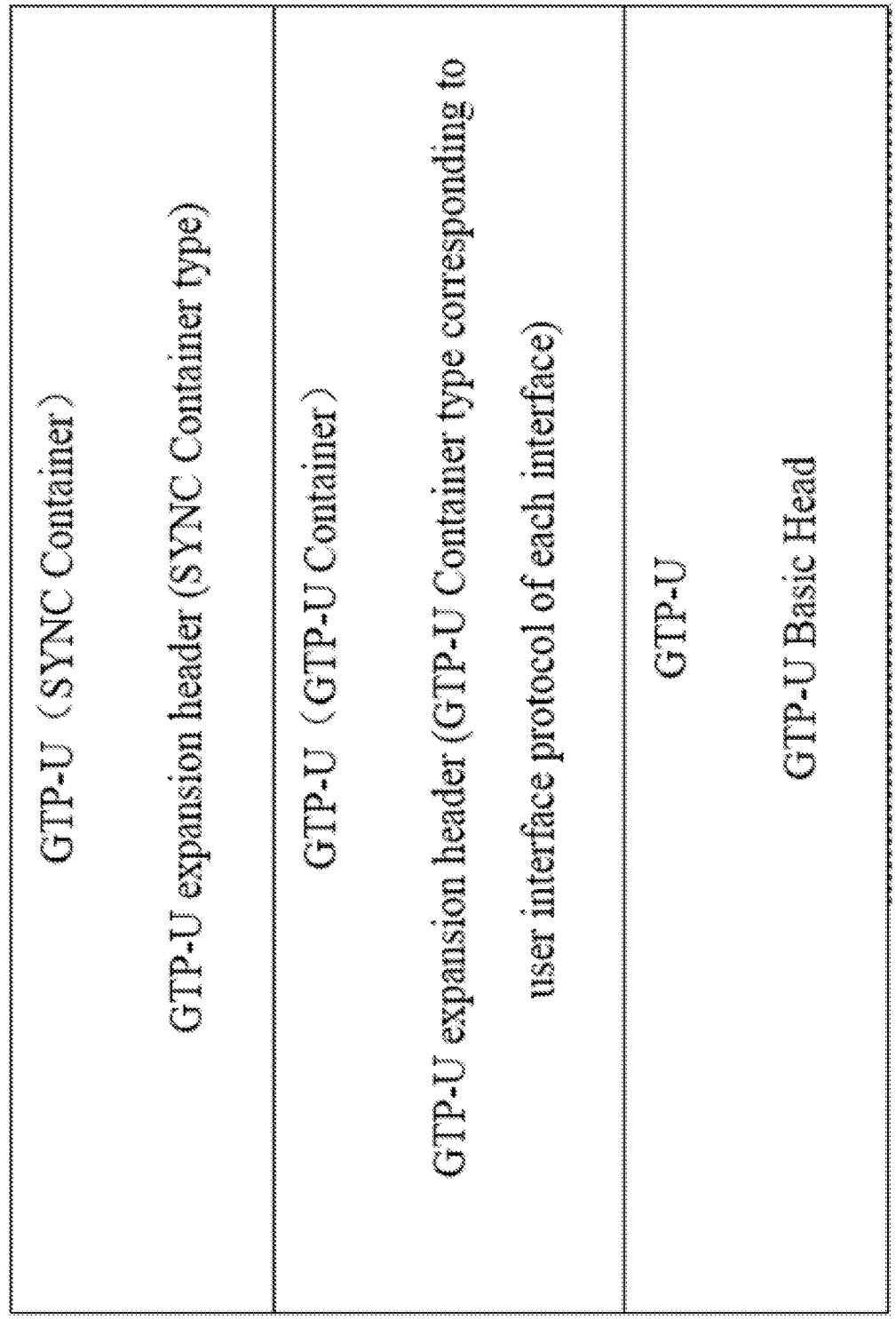
FIG. 7 illustrates a diagram of an example GTP-U header cascade structure, in accordance with an embodiment of the present disclosure.

FIG. 7 illustrates a diagram of an example GTP-U header cascade structure, in accordance with an embodiment of the present disclosure. As shown in FIG. 7, the SYNC Container type extension header forms a cascade extension header in each interface with the "GTP-U Container" corresponding to each interface.

2.1 GTP-U Container Formats

Figure 10:
FIG. 10 illustrates a diagram of an example SYNC INFORMATION WITH LENGTH OF PACKETS (PDU Type Z) format, in accordance with an embodiment of the present disclosure.

In some embodiments, the specific format of the GTP-U Container carrying the synchronization instruction information is the same. In order to enable gNB-DU to identify the sending time and packet loss of MBS service data, three GTP-U Container formats that carry synchronization indication information may be defined: MBS USER DATA (PDU Type X), SYNC INFORMATION WITHOUT PAYLOAD (PDU Type Y), SYNC INFORMATION WITH uncompressed header (PDU Type Z), as shown in FIG. 8, FIG. 9, and FIG. 10 respectively.

In some embodiments, the values of X, Y, and Z may be different from the values of the PDU Types that already exist on each interface. In some embodiments, the values of X, Y, and Z may be any value from 0 to 15.

Figure 8:
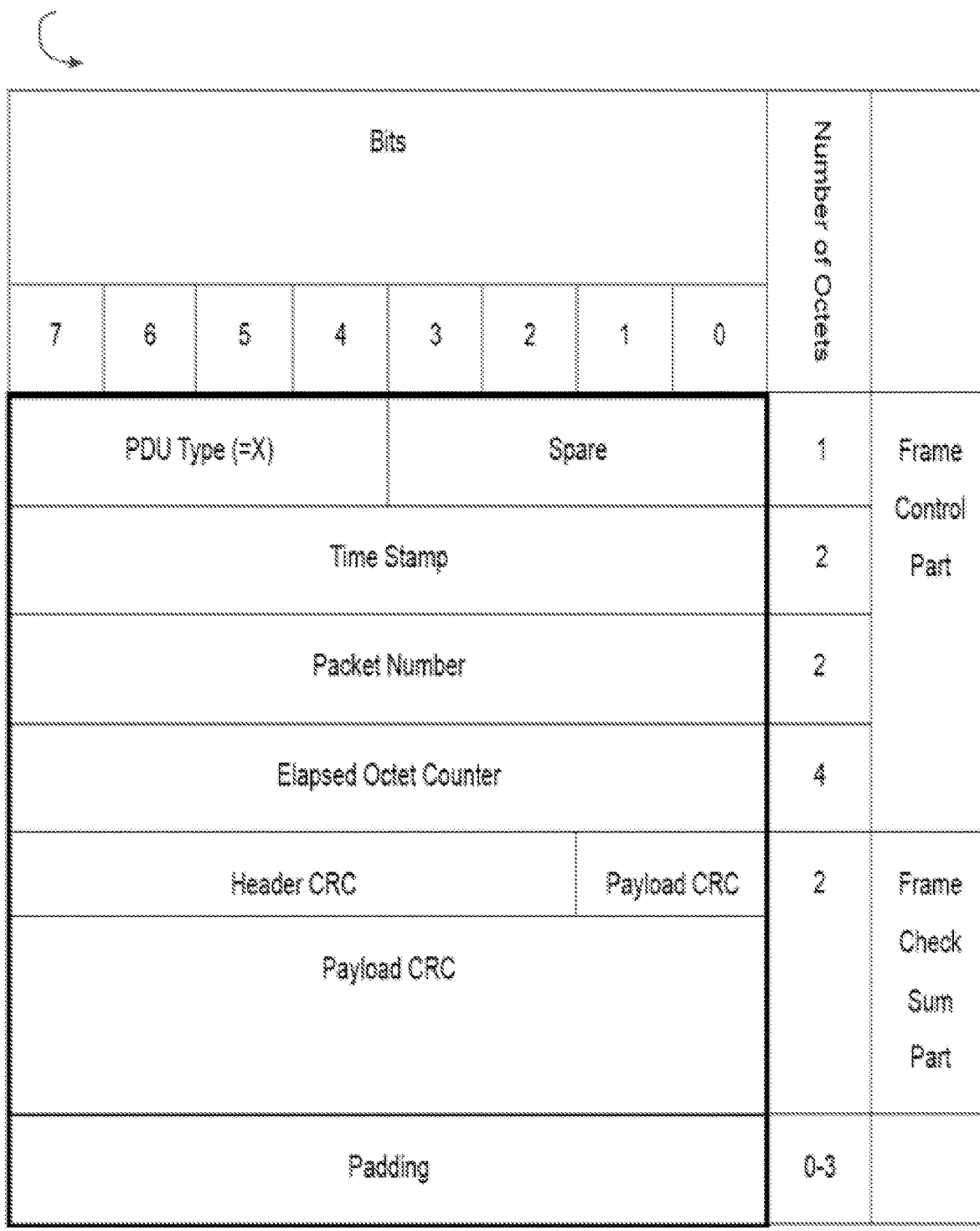
FIG. 8 illustrates a diagram of an example MBS USER DATA (PDU Type X) format, in accordance with an embodiment of the present disclosure.

FIG. 8 illustrates a diagram of an example MBS USER DATA (PDU Type X) format, in accordance with an embodiment of the present disclosure.

The MBS USER DATA (PDU Type X) is used to transmit synchronization indication information associated with MBS service data on the user plane over an N3/Xn-U/F1-U interface to allow service data to be sent synchronously across all cells within the group of cells. The MBS USER DATA frame format is shown in FIG. 8. The associated MBS service data is contained in T-PDU.

FIG. 9 illustrates a diagram of an example SYNC INFORMATION WITHOUT PAYLOAD (PDU Type Y) format, in accordance with an embodiment of the present disclosure.

The SYNC INFORMATION WITHOUT PAYLOAD (PDU Type Y) and SYNC INFORMATION WITH UNCOMPRESSED HEADER (PDU Type Z) are used to transmit synchronization instruction information on the user plane over an N3/Xn-U/F1-U interface to allow the receiving end (e.g., gNB-DU) to improve resynchronization capability in case of packet loss.

The SYNC INFORMATION WITHOUT PAYLOAD (PDU Type Y) is used to transmit synchronization indication information when the GTP-U PDU does not carry T-PDU payload data. The SYNC INFORMATION WITHOUT PAYLOAD frame format is shown in FIG. 9.

FIG. 10 illustrates a diagram of an example SYNC INFORMATION WITH LENGTH OF PACKETS (PDU Type Z) format, in accordance with an embodiment of the present disclosure.

The SYNC INFORMATION WITHOUT PAYLOAD (PDU Type Z) is used to carry synchronization indication information in the GTP-U PDU. The T-PDU payload data is the length of packets, excluding the MBS service data payload. The SYNC INFORMATION WITH LENGTH OF PACKETS frame format is shown in FIG. 10.

The definition of each IE is as follows. The PDU Type indicates the structure of the interface UP frame over an N3/Xn-U/F1-U interface with 4 bits. The Time Stamp uses 2 bytes to indicate the start time of a synchronization sequence in a synchronization period, which is represented by a relative time value. The Packet Number indicates in 2 bytes the number of data packets that have been counted in the synchronization sequence. Elapsed Octet Counter uses 4 bytes to represent the number of bytes that have been counted in the synchronization sequence. Total Number of Packet uses 3 bytes to indicate the number of packets accumulated in a synchronization period. Total Number of Octet uses 5 bytes to indicate the number of bytes accumulated in a synchronization period. The Header CRC indicates the CRC of the Frame Control Part in 6 bytes, and the Payload CRC indicates the CRC of the T-PDU payload in 10 bytes. Padding is set to 0 for byte alignment and to ensure that the N3/Xn-U/F1-U interface user plane protocol PDU length is (n*4−2) octets, where n is a positive integer. Length of the Nth Packet indicates the length of the packet within the synchronization sequence.

Figure 11:
FIG. 11 is a flow diagram depicting a method for transmitting MBS user data while carrying data synchronization information, in accordance with some embodiments of the present disclosure.

2.2 Exemplary Method for Carrying Synchronization Info in the GTP-U Extension Header FIG. 11 is a flow diagram depicting a method for transmitting MBS user data while carrying data synchronization information, in accordance with some embodiments of the present disclosure. Additional, fewer, or different operations may be performed in the method depending on the particular embodiment. In some embodiments, some or all operations of method 1100 may be performed by a transmitting end. In some operations, some or all operations of method 1100 may be performed by a receiving end. Each operation may be re-ordered, added, removed, or repeated.

At operation 1102, the MBS service data stream or the MBS service data stream carrying the synchronization instruction information arrives at the sending end.

At operation 1104, the sender obtains the value of the synchronization instruction information. In some embodiments, the sender obtains relevant information from the memory and autonomously determines the value of the synchronization instruction information. In some embodiments, the sender reads the value of the synchronization instruction information from the MBS service data stream carrying the synchronization instruction information and makes modifications or does not make modifications.

At operation 1106, the GTP-U PDU of the interface is assembled on the sending end. In some embodiments, the transmitting end packs the synchronization information into SYNC Container type extension header or the GTP-U Container extension header corresponding to the user interface protocol of the interface. In some embodiments, the format of the GTP-U extension header carrying the synchronization information is PDU Type X Format as shown in FIG. 8, and the T-PDU carries the MBS service data.

At operation 1108, the transmitting end transmits the GTP-U PDU to the receiving end through the interface.

At operation 1110, the receiving end accepts the GTP-U PDU, reads the synchronization instruction information in the GTP extension header, and checks the consistency. If the receiving end is a gNB-DU, then it uses these information to determine the synchronization sending time of MBS service data.

Figure 12:
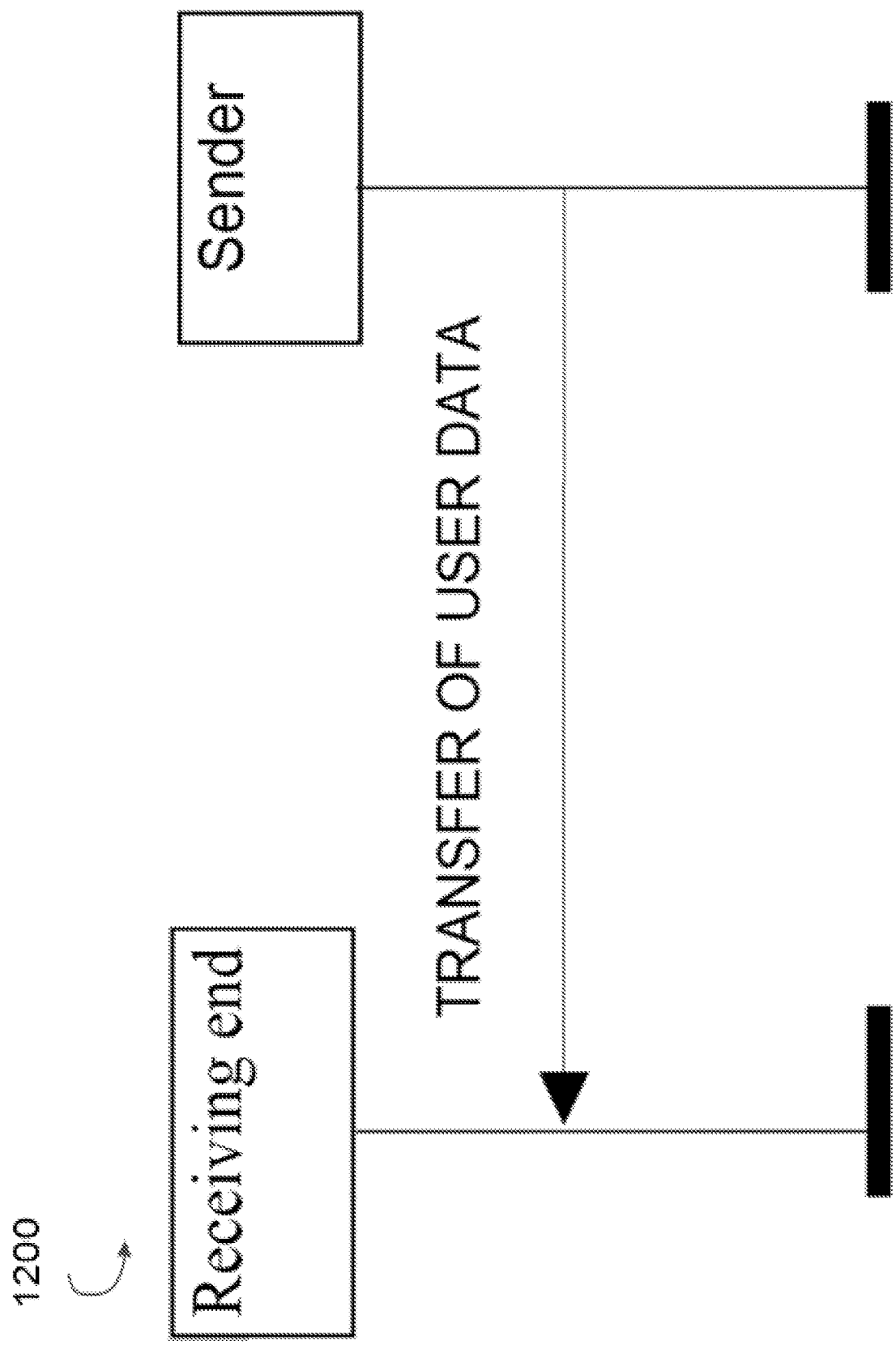
FIG. 12 illustrates a block diagram of an example environment for transmitting MBS user data that carries data synchronization information, in accordance with some embodiments of the present disclosure.

FIG. 12 illustrates a block diagram of an example environment for transmitting MBS user data that carries data synchronization information, in accordance with some embodiments of the present disclosure. The environment 1200 includes a sender 1202 that transfers user data to a receiving end 1204.

FIG. 13 is a flow diagram depicting a method for transmitting MBS synchronization information, in accordance with some embodiments of the present disclosure. Additional, fewer, or different operations may be performed in the method depending on the particular embodiment. In some embodiments, some or all operations of method 1300 may be performed by a transmitting end. In some operations, some or all operations of method 1300 may be performed by a receiving end. Each operation may be re-ordered, added, removed, or repeated.

At operation 1302, the sender obtains the value of the synchronization instruction information. In some embodiments, at the end of each synchronization sequence, gNB-CU acquires relevant information from the memory and autonomously determines the value of the synchronization instruction information identifier. In some embodiments, gNB-CU reads from the MBS service data stream carrying the synchronization instruction information synchronize the value of the indication information with or without modification.

At operation 1304, the GTP-U PDU of the interface is assembled on the sending end. In some embodiments, the transmitting end packs the synchronization information into the SYNC Container type extension header or the GTP-U Container extension header corresponding to the user plane protocol of each interface. In some embodiments, the format of the GTP-U extension header carrying the synchronization information is PDU Type Y Format as shown in FIG. 9, and T-PDUs do not carry MBS service data. In some embodiments, the format of the GTP-U extension header carrying the synchronization information is PDU Type Z Format as shown in FIG. 10, and T-PDUs do not carry MBS service data but carry Length of the 1st, 2nd, . . . , Nth Packet.

At operation 1306, the transmitting end transmits the GTP-U PDU to the receiving end through the interface.

At operation 1308, the receiving end accepts the GTP-U PDU, reads the synchronization instruction information in the GTP extension header, and checks the consistency to improve resynchronization in case of packet loss.

Figure 14:
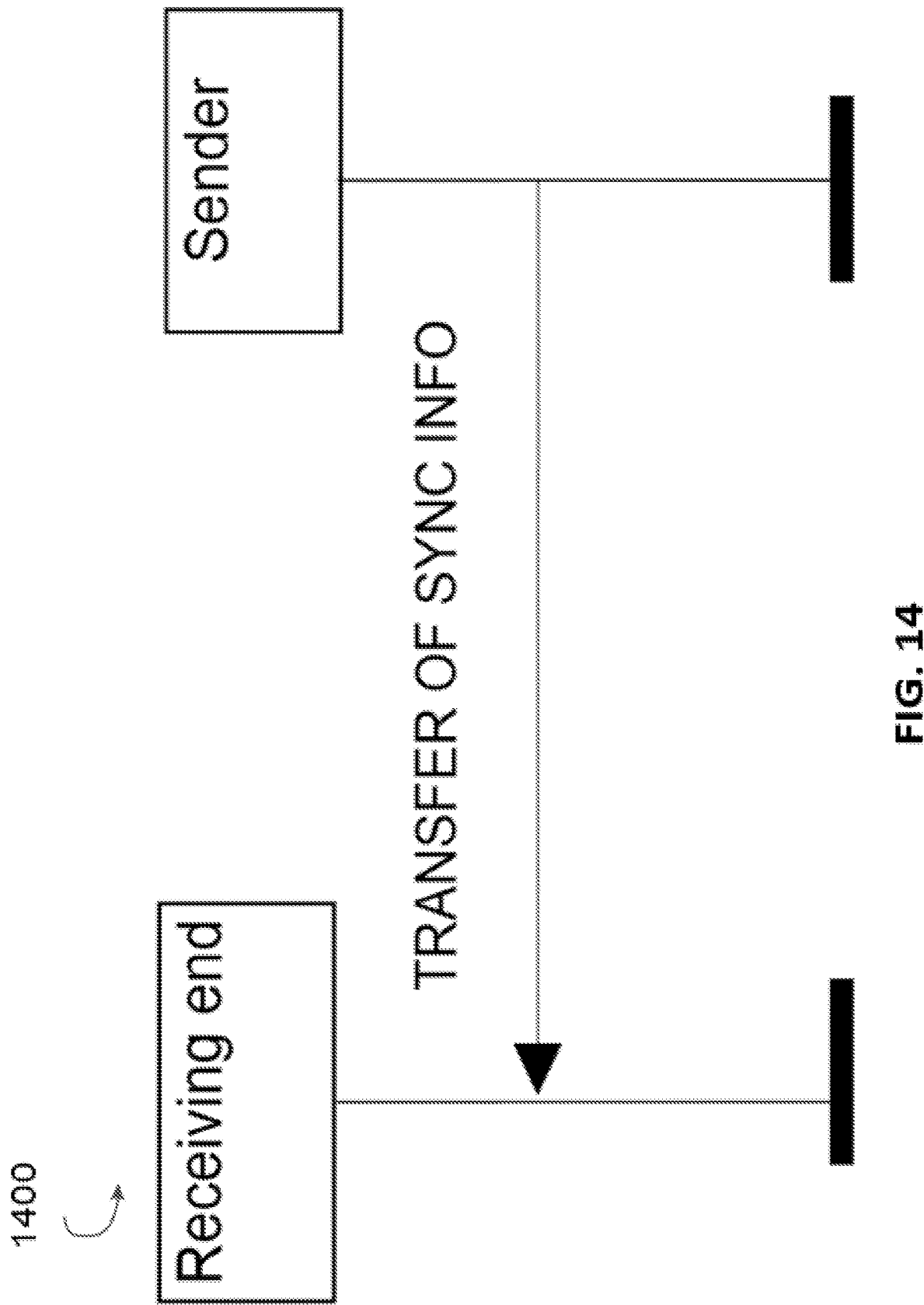
FIG. 14 illustrates a block diagram of an example environment for transmitting MBS service data synchronization information, in accordance with some embodiments of the present disclosure.

FIG. 14 illustrates a block diagram of an example environment for transmitting MBS service data synchronization information, in accordance with some embodiments of the present disclosure. The environment 1400 includes a sender 1402 that transfers SYNC INFO to a receiving end 1404.

3. Carrying Synchronization Information in the SYNC Layer

FIG. 15 illustrates a block diagram of an example N3/Xn-U/F1-U protocol stack interface, in accordance with some embodiments of the present disclosure. As shown, a SYNC protocol layer (e.g., a user plane protocol layer) that exists above the transport network layer may be used to transmit synchronization indication information on each N3/Xn-U/F1-U interface. The SYNC protocol layer is a user plane protocol to enable data flow of each interface to carry synchronization instruction information.

In each interface, in order to allow the receiving end to identify whether the upper layer data of the transmission network layer is a SYNC PDU or other interface user plane protocol PDUs that do not carry the SYNC layer, each interface carries the "whether the upper layer has SYNC Protocol layer identification".

3.1 A "First" Method for Defining a PDU Type (=K)

Figure 16:
FIG. 16 illustrates a diagram of an example identification of the user plane protocol PDU format of each interface carrying the SYNC protocol layer, in accordance with an embodiment of the present disclosure.

FIG. 16 illustrates a diagram of an example identification of the user plane protocol PDU format of each interface carrying the SYNC protocol layer, in accordance with an embodiment of the present disclosure.

It is still the existing GTP-U Container type of each interface that carries the "Is there a SYNC protocol layer identifier?" in each N3/Xn-U/F1-U interface, a user plane PDU format of a PDU Type (=K) is defined for the interface to identify the upper layer data as a SYNC PDU, as shown in FIG. 16. In some embodiments, the value of K is different from the user plane protocol PDU type defined for unicast services in each interface.

In some embodiments, a first network node may transmit a synchronization information to a second network node. The synchronization information may indicate a plurality of information elements configured to transmit Multicast/Broadcast Service (MBS) data on a user plane over an interface.

In some embodiments, the first network node may use a synchronization layer to transmit the synchronization information to the second network node. The defined synchronization layer is on top of the Transport Network Layer (TNL). The first network node may indicate, in the TNL, whether the synchronization protocol layer exists on top of the TNL.

In some embodiments, to indicate in the TNL whether the synchronization protocol layer exists on top of the TNL, the first network node and/or the second network node may select, based on the interface, a GTP-U extension header from a plurality of predefined extension headers. In some embodiments, each of the plurality of predefined extension headers corresponding to one of a plurality of interfaces.

In some embodiments, the first network node and/or the second network node may define, for the interface, a specific PDU to indicate whether the synchronization protocol layer exists on top of the TNL.

3.2 A "Second" Method for Defining a SYNC Container Type

Figure 17:
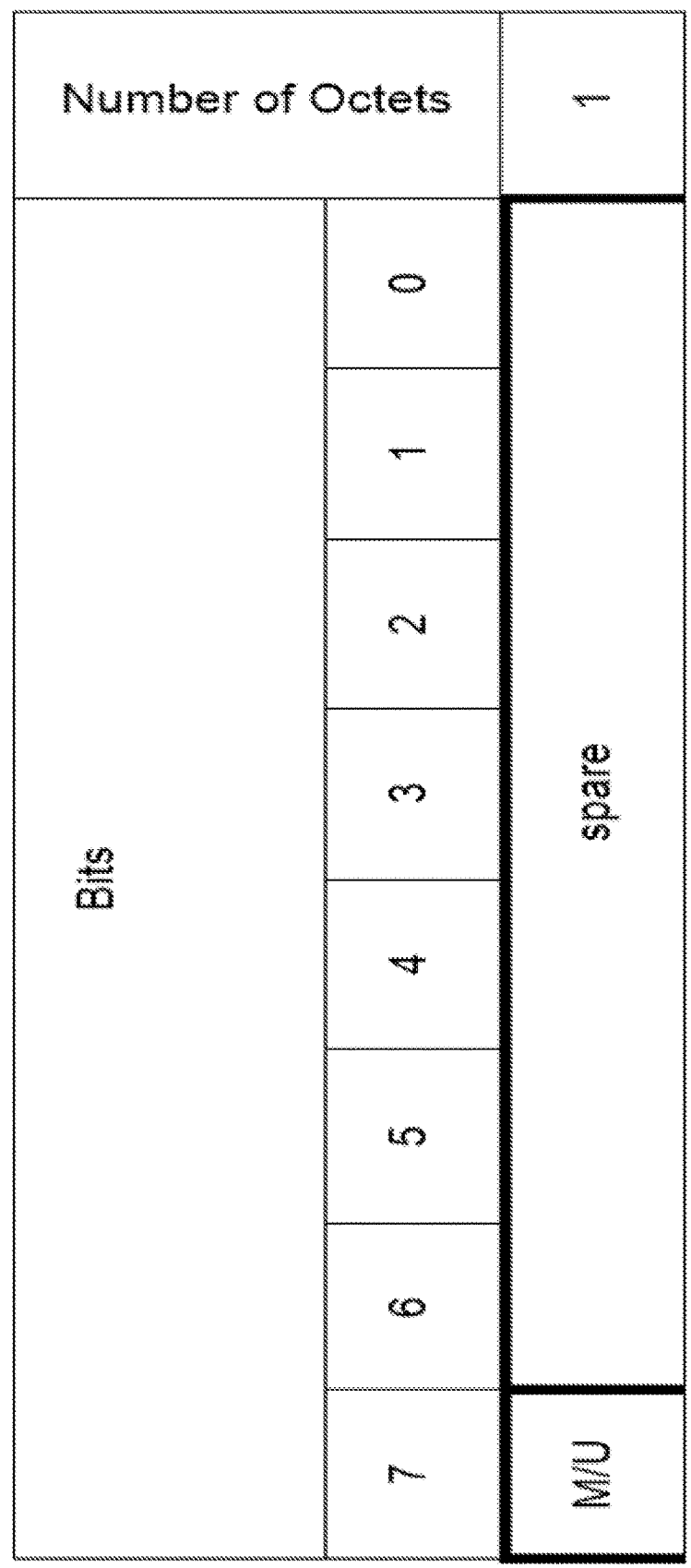
FIG. 17 illustrates a diagram identifying the SYNC Container carrying the SYNC protocol layer, in accordance with an embodiment of the present disclosure.

FIG. 17 illustrates a diagram identifying the SYNC Container carrying the SYNC protocol layer, in accordance with an embodiment of the present disclosure.

A GTP-U extension header type, herein referred to as "a SYNC Container" may be defined. The SYNC Container type extension header forms a cascade extension header in each interface with a "GTP-U Container" type extension header corresponding to each interface. The SYNC Container format definition is shown in FIG. 17. The M/U IE "identifies" whether the upper-layer data packet is a SYNC PDU with 1 bit. M/U is '0' to indicate a SYNC PDU, and M/U to 1 indicates not a SYNC PDU.

In some embodiments, the first network node and/or the second network node use the defined SYNC Container type extension header to indicate whether the synchronization protocol layer exists on top of the TNL. The first network node combines the SYNC Container type extension header with a plurality of predefined extension headers. Each of the plurality of predefined extension headers corresponding to one of a plurality of interfaces.

3.3 A "Third" Method for Defining a Message Type in GTP-U header

FIG. 18 illustrates a diagram of an example Message Type value definition, in accordance with an embodiment of the present disclosure.

In some embodiments, the first network node and/or the second network node defines a message type in a GTP-U header to indicate whether the synchronization protocol layer exists on top of the TNL.

A message type, herein referred to as "G-PDU with SYNC"" may be defined in the Message Type IE of the GTP-U basic header. It is used to "identify" that the upper layer carries the SYNC protocol layer. The Message Type value defined for it must be the same as other Message Type is different, such as '253' or other values not used by the existing protocol (29.060).

In some embodiments, the first network node and/or the second network node packs the synchronization information in a downlink PDU over an interface selected from the group consisting of: an N3 interface, an Xn-U interface, and an F1-U interface.

In some embodiments, the first network node packs the synchronization information by determining whether the first network node has received the synchronization information associated with the MBS data. In some embodiments, the first network node, in response to determining that the first network node has not received the synchronization information, internally configures parameters for the synchronization information. In some embodiments, the first network node, in response to determining that the first network node has not received the synchronization information in response to determining that the first network node has received the synchronization information, selectively updating, by the first network node, parameters retrieved from the MBS data to configure the synchronization information.

Figure 20:
FIG. 20 illustrates a diagram of an example SYNC PDU Type Y Format, in accordance with an embodiment of the present disclosure.

3.4 Defining the SYNC PDU Format for the "First", "Second" and/or "Third" Methods In the three methods, the SYNC PDU frame format can follow the SYNC PDU frame format defined by 3GPP 25.446 for CN to RAN, as shown in FIG. 19, FIG. 20, and FIG. 21.

FIG. 19 illustrates a diagram of an example SYNC PDU Type X Format, in accordance with an embodiment of the present disclosure. The MBS USER DATA (PDU Type X) is used to transmit synchronization indication information associated with MBS service data on the user plane of each interface to allow service data to be sent synchronously across all cells in the group of cells. The MBS USER DATA frame format is shown in FIG. 21.

FIG. 20 illustrates a diagram of an example SYNC PDU Type Y Format, in accordance with an embodiment of the present disclosure. The SYNC INFORMATION WITHOUT PAYLOAD (PDU Type Y) and SYNC INFORMATION WITH UNCOMPRESSED HEADER (PDU Type Z) are used to transmit synchronization instruction information on the user interface of each interface to allow the receiving end (e.g., gNB-DU) to improve the resynchronization ability in the case of packet loss. The SYNC INFORMATION WITHOUT PAYLOAD (PDU Type Y) is used to transmit synchronization indication information when the GTP-U PDU does not carry T-PDU load data. The SYNC INFORMATION WITHOUT PAYLOAD frame format is shown in FIG. 20.

FIG. 21A illustrates a diagram of an example SYNC PDU Type Z Format (Odd number of packets, i.e. N=1, 3, 5, etc.), in accordance with an embodiment of the present disclosure. FIG. 21B illustrates a diagram of an example SYNC PDU Type Z Format (Even number of packets, i.e. N=2, 4, 6, etc.), in accordance with an embodiment of the present disclosure. The SYNC INFORMATION WITHOUT PAYLOAD (PDU Type Z) is used to carry synchronization indication information in the GTP-U PDU. The load data of the SYNC PDU is Length of packets, excluding MBS service data load. The SYNC INFORMATION WITH LENGTH OF PACKETS frame format is shown in FIG. 21A (the number of packets is odd) and FIG. 21B (the number of packets is even).

4. Exemplary Methods for Carrying Synchronization Info in the SYNC PDU Header

Figure 22:
FIG. 22 is a flow diagram depicting a method for transmitting MBS service data that carries data synchronization information.

FIG. 22 is a flow diagram depicting a method for transmitting MBS service data that carries data synchronization information. Additional, fewer, or different operations may be performed in the method depending on the particular embodiment. In some embodiments, some or all operations of method 2200 may be performed by a transmitting end. In some operations, some or all operations of method 2200 may be performed by a receiving end. Each operation may be re-ordered, added, removed, or repeated.

At operation 2202, the MBS service data stream or the MBS service data stream carrying the synchronization instruction information arrives at the sending end.

At operation 2204, the sender obtains the value of the synchronization instruction information. In some embodiments, the sender obtains relevant information from the memory and autonomously determines the value of the synchronization instruction information. In some embodiments, the sender reads the value of the synchronization instruction information from the MBS service data stream carrying the synchronization instruction information and makes modifications or does not make modifications.

At operation 2206, assemble the user-side SYNC PDU of the interface at the sender. In some embodiments, the SYNC PDU header contains synchronization indication information. In some embodiments, the load of the SYNC PDU is MBS service data.

At operation 2208, the sender assembles the GTP-U PDU, the T-PDU contains the SYNC PDU, and the GTP-U header carries "Is there a SYNC protocol layer identifier?".

At operations 2210, the receiving end accepts the GTP-U PDU and determines in the GTP-U header whether it contains a SYNC PDU. If yes, read the synchronization indication information according to the SYNC PDU format and check the consistency. If the receiving end is gNB-DU, the receiving end uses the synchronization indication information to determine the synchronization sending time of MBS service data.

Figure 23:
FIG. 23 is a flow diagram depicting a method for transmitting MBS synchronization information.

FIG. 23 is a flow diagram depicting a method for transmitting MBS synchronization information. Additional, fewer, or different operations may be performed in the method depending on the particular embodiment. In some embodiments, some or all operations of method 2300 may be performed by a wireless communication node. In some operations, some or all operations of method 2300 may be performed by a wireless communication device. Each operation may be re-ordered, added, removed, or repeated.

At operation 2302, the sender obtains the value of the synchronization instruction information. In some embodiments, at the end of each synchronization sequence, the sender obtains relevant information from the memory and autonomously determines the value of the synchronization instruction information. In some embodiments, the sender reads the synchronization instruction from the MBS service data stream carrying the synchronization instruction information. At operation 2304, the sender assembles the SYNC PDU of the interface. In some embodiments, the SYNC PDU does not carry MBS service data, the SYNC PDU load is empty or Length of Packets, and the SYNC PDU header contains synchronization indication information. At operation 2306, the sender assembles the GTP-U PDU. In some embodiments, the T-PDU contains the SYNC PDU and the GTP-U header carries "Is there a SYNC protocol layer identifier?". At operation 2308, the transmitting end transmits the GTP-U PDU to the receiving end through the interface. At operation 2310, the receiving end accepts the GTP-U PDU and determines in the GTP-U header whether it contains a SYNC PDU. If yes, read the synchronization indication information according to the SYNC PDU format and check the consistency, in order to improve resynchronization in the case of packet loss.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
   transmitting, by a first network node comprising gNB-CU node, synchronization information to a second network node comprising a gNB-DU node, the synchronization information transmitted by the first network node to the second network node in a General Packet Radio Service Tunneling Protocol-User (GTP-U) extension header selected from a plurality of predefined extension headers according to an interface which is to be used for transmission of Multicast/Broadcast Service (MBS) service data, each of the plurality of predefined extension headers corresponding to one of a plurality of interfaces, wherein the GTP-U extension header is combined with at least some of the plurality of predefined extension headers,
   wherein the synchronization information indicates instructions for transmitting the MBS service data on a user plane over the interface comprising at least one of an N3 interface, an Xn-U interface, or an F1-U interface, and wherein the GTP-U extension header configures synchronous transmission of the MBS service data across a gNB or cells in a gNB-DU cell group.

2. The wireless communication method of claim 1, wherein a specific Protocol Data Unit (PDU) format is defined for the interface.

3. The wireless communication method of claim 2, wherein the PDU format includes a padding information element to ensure that a length of the PDU format to be 4×n−2, where n is a positive integer.

4. The wireless communication method of claim 1, further comprising:
   combining, by the first network node, the GTP-U extension header with each of the plurality of predefined extension headers.

5. The wireless communication method of claim 1, wherein a synchronization protocol layer is defined to transmit the synchronization information, the defined synchronization layer being on top of a Transport Network Layer (TNL), the method further comprising:
   indicating, by the first network node in the TNL, whether the synchronization protocol layer exists on top of the TNL.

6. The wireless communication method of claim 5, wherein indicating, in the TNL, whether the synchronization protocol layer exists on top of the TNL further comprises:
   selecting, by the first network node according to the interface, the GTP-U extension header from the plurality of predefined extension headers,
   wherein a specific Protocol Data Unit (PDU) is defined to indicate whether the synchronization protocol layer exists on top of the TNL.

7. The wireless communication method of claim 5, wherein a GTP-U extension header is defined to indicate whether the synchronization protocol layer exists on top of the TNL, and wherein indicating, in the TNL, whether the synchronization protocol layer exists on top of the TNL further comprises:
   combining, by the first network node, the GTP-U extension header with a plurality of predefined extension headers, each of the plurality of predefined extension headers corresponding to one of a plurality of interfaces.

8. The wireless communication method of claim 5, wherein a message type in a GTP-U header is defined to indicate whether the synchronization protocol layer exists on top of the TNL.

9. The wireless communication method of claim 1, further comprising:
   packing, by the first network node, the synchronization information in a downlink PDU over the interface.

10. The wireless communication method of claim 9, wherein packing the synchronization information further comprises:
    determining, by the first network node, whether the first network node has received the synchronization information associated with the MBS data;
    in response to determining that the first network node has not received the synchronization information, configuring, by the first network node, parameters for the synchronization information; and
    in response to determining that the first network node has received the synchronization information, selectively updating, by the first network node, parameters retrieved from the MBS data to configure the synchronization information.

11. A first network node comprising a gNB-CU node, the first network node comprising:
    at least one processor configured to:
    transmit, via a transmitter, synchronization information to a second network node comprising a gNB-DU node, in a General Packet Radio Service Tunneling Protocol-User (GTP-U) extension header selected from a plurality of predefined extension headers according to an interface which is to be used for transmission of Multicast/Broadcast Service (MBS) service data, each of the plurality of predefined extension headers corresponding to one of a plurality of interfaces, wherein the GTP-U extension header is combined with at least some of the plurality of predefined extension headers,
    wherein the synchronization information indicates instructions for transmitting the MBS service data on a user plane over the interface comprising at least one of an N3 interface, an Xn-U interface, or an F1-U interface, and wherein the GTP-U extension header configures synchronous transmission of the MBS service data across a gNB or cells in a gNB-DU cell group.

12. The first network node of claim 11, wherein a specific Protocol Data Unit (PDU) format is defined for the interface.

13. The first network node of claim 12, wherein the PDU format includes a padding information element to ensure that a length of the PDU format to be 4×n−2, where n is a positive integer.

14. The first network node of claim 11, wherein the at least one processor is configured to:
    combine the GTP-U extension header with each of the plurality of predefined extension headers.

15. The first network node of claim 11, wherein a synchronization protocol layer is defined to transmit the synchronization information, the defined synchronization layer being on top of a Transport Network Layer (TNL), and the at least one processor is configured to:

indicate, in the TNL, whether the synchronization protocol layer exists on top of the TNL.

16. The first network node of claim 15, wherein the at least one processor is configured to indicate, in the TNL, whether the synchronization protocol layer exists on top of the TNL, to:
    select, according to the interface, the GTP-U extension header from the plurality of predefined extension headers,
    wherein a specific Protocol Data Unit (PDU) is defined to indicate whether the synchronization protocol layer exists on top of the TNL.

* * * * *